United States Patent
Lou et al.

(10) Patent No.: US 9,625,723 B2
(45) Date of Patent: Apr. 18, 2017

(54) EYE-TRACKING SYSTEM USING A FREEFORM PRISM

(71) Applicant: MICROSOFT TECHNOLOGY LICENSING, LLC, Redmond, WA (US)

(72) Inventors: Xinye Lou, Redmond, WA (US); Scott McEldowney, Redmond, WA (US); Steve Robbins, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 214 days.

(21) Appl. No.: 13/926,968

(22) Filed: Jun. 25, 2013

(65) Prior Publication Data
US 2014/0375789 A1 Dec. 25, 2014

(51) Int. Cl.
*G02B 27/01* (2006.01)
*G06F 3/01* (2006.01)
*G02B 27/00* (2006.01)

(52) U.S. Cl.
CPC ....... *G02B 27/0172* (2013.01); *G02B 27/017* (2013.01); *G06F 3/013* (2013.01); *G02B 27/0093* (2013.01); *G02B 2027/0178* (2013.01); *G02B 2027/0187* (2013.01)

(58) Field of Classification Search
CPC .............. G02B 27/0172; G02B 27/017; G02B 27/0093; G02B 2027/0178; G02B 2027/0787; G02B 2027/0187; G06F 3/013
See application file for complete search history.

(56) References Cited

U.S. PATENT DOCUMENTS

| 4,711,512 | A |   | 12/1987 | Upatnieks |
| 4,731,462 | A | * | 3/1988  | Russo ............... C23C 16/407 |
|           |   |   |         | 427/376.2 |

(Continued)

FOREIGN PATENT DOCUMENTS

| EP | 0408344 A2 | 1/1991 |
| EP | 0687932 A2 | 12/1995 |

(Continued)

OTHER PUBLICATIONS

Handa, S. et al., "Development of Head-Mounted Display with Eye-Gaze Detection Function for the Severely Disabled," VECIMS 2008—IEEE International Conference on Virtual Environments, Human-Computer Interfaces, and Measurement Systems, pp. 140-144, Jul. 14-16, 2008, 5 pages.

(Continued)

*Primary Examiner* — Jay Patel
*Assistant Examiner* — Joseph Suh
(74) *Attorney, Agent, or Firm* — Alleman Hall McCoy Russell & Tuttle LLP (57) ABSTRACT

An example see-through head-mounted display system includes a freeform prism and a display device configured to emit display light through the freeform prism to an eye of a user. The see-through head-mounted display system may also include an imaging device having an entrance pupil positioned at a back focal plane of the freeform prism, the imaging device configured to receive gaze-detection light reflected from the eye and directed through the freeform prism.

20 Claims, 5 Drawing Sheets

(56) References Cited

U.S. PATENT DOCUMENTS

| | | | | |
|---|---|---|---|---|
| 5,044,727 A * | 9/1991 | Steinle | ............... | G02B 27/1006 250/226 |
| 5,331,149 A | 7/1994 | Spitzer et al. | | |
| 5,459,611 A * | 10/1995 | Bohn | ............... | G02B 6/29362 359/618 |
| 5,583,335 A | 12/1996 | Spitzer et al. | | |
| 5,856,842 A | 1/1999 | Tedesco | | |
| 6,163,336 A | 12/2000 | Richards | | |
| 6,323,970 B1 | 11/2001 | Popovich | | |
| 6,550,917 B1 * | 4/2003 | Neal | ............... | A61B 3/158 351/221 |
| 6,580,529 B1 | 6/2003 | Amitai et al. | | |
| 7,184,615 B2 | 2/2007 | Levola | | |
| 7,522,344 B1 | 4/2009 | Curatu et al. | | |
| 7,576,916 B2 | 8/2009 | Amitai | | |
| 7,872,635 B2 | 1/2011 | Mitchell | | |
| 8,154,583 B2 | 4/2012 | Kurtz et al. | | |
| 8,160,411 B2 | 4/2012 | Levola et al. | | |
| 8,233,204 B1 | 7/2012 | Robbins et al. | | |
| 8,467,133 B2 * | 6/2013 | Miller | ............... | G02B 27/017 353/28 |
| 8,472,120 B2 * | 6/2013 | Border | ............... | G02B 27/0093 353/28 |
| 8,611,014 B2 | 12/2013 | Valera et al. | | |
| 8,817,350 B1 | 8/2014 | Robbins et al. | | |
| 2001/0028438 A1 * | 10/2001 | Matsumoto | ............ | A61B 3/152 351/206 |
| 2002/0034016 A1 * | 3/2002 | Inoguchi | ............... | G03B 21/10 359/630 |
| 2003/0077459 A1 * | 4/2003 | Vitt | ............... | C03C 17/3417 428/432 |
| 2004/0196433 A1 | 10/2004 | Durnell | | |
| 2005/0122464 A1 * | 6/2005 | Lu | ............... | G02F 1/133351 349/190 |
| 2005/0174535 A1 * | 8/2005 | Lai | ............... | A61B 3/1015 351/205 |
| 2006/0072205 A1 * | 4/2006 | Li | ............... | G02B 27/0172 359/630 |
| 2006/0077558 A1 * | 4/2006 | Urakawa | ............... | A61B 3/0008 359/630 |
| 2006/0198027 A1 | 9/2006 | Li | | |
| 2006/0215111 A1 * | 9/2006 | Mihashi | ............... | A61B 3/103 351/205 |
| 2007/0041684 A1 | 2/2007 | Popovich et al. | | |
| 2007/0109619 A1 * | 5/2007 | Eberl | ............... | A61B 3/113 359/17 |
| 2008/0024392 A1 * | 1/2008 | Gustafsson | ............ | G02B 27/017 345/8 |
| 2009/0189830 A1 | 7/2009 | Deering et al. | | |
| 2009/0219484 A1 * | 9/2009 | Ebisawa | ............... | G06F 3/013 351/210 |
| 2010/0328623 A1 | 12/2010 | Takahashi | | |
| 2011/0043644 A1 | 2/2011 | Munger et al. | | |
| 2011/0085242 A1 * | 4/2011 | Bryant | ............... | G02B 5/04 359/641 |
| 2012/0139817 A1 | 6/2012 | Freeman | | |
| 2012/0162549 A1 * | 6/2012 | Gao | ............... | G02B 27/0172 349/11 |
| 2012/0326948 A1 | 12/2012 | Crocco et al. | | |
| 2013/0077049 A1 | 3/2013 | Bohn | | |
| 2013/0083173 A1 | 4/2013 | Geisner et al. | | |
| 2013/0162673 A1 * | 6/2013 | Bohn | ............... | G02B 27/0172 345/633 |
| 2014/0071539 A1 * | 3/2014 | Gao | ............... | G02B 27/0025 359/630 |
| 2014/0104665 A1 | 4/2014 | Popovich et al. | | |
| 2014/0140653 A1 | 5/2014 | Brown et al. | | |
| 2014/0140654 A1 | 5/2014 | Brown et al. | | |
| 2014/0177023 A1 * | 6/2014 | Gao | ............... | H04N 5/2258 359/238 |
| 2014/0204455 A1 | 7/2014 | Popovich et al. | | |
| 2014/0361957 A1 * | 12/2014 | Hua | ............... | G06F 3/013 345/8 |
| 2014/0375790 A1 * | 12/2014 | Robbins | ............ | G02B 27/0172 348/78 |

FOREIGN PATENT DOCUMENTS

| | | |
|---|---|---|
| EP | 1089111 A1 | 4/2001 |
| JP | 2002328330 A | 11/2002 |
| WO | 2012172295 A1 | 12/2012 |

OTHER PUBLICATIONS

ISA European Patent Office, International Search Report and Written Opinion Issued in Application No. PCT/US2014/043547, Oct. 1, 2014, WIPO, 10 pages.

ISA European Patent Office, International Search Report and Written Opinion Issued in Application No. PCT/US2014/043549, Oct. 1, 2014, WIPO, 11 pages.

Curatu et al., "Projection-based Head-mounted Display with Eye-tracking Capabilities", Retrieved at <<http://www.creol.ucf.edu/Research/Publications/1419.pdf>>, In Optics & Photonics—International Society for Optics and Photonics, Aug. 2005, 9 pages.

Curatu, et al., "Dual Purpose Lens for an Eye-Tracked Projection HeadMounted Display", Retrieved at http://www.creol.ucf.edu/Research/Publications/1410.PDF>> in Proceedings of the International Optical Design Conference Vancouver, Jun. 6, 2006, pp. 7.

Minier, V. et al., "Diffraction Characteristics of Superimposed Holographic Gratings in Planar Optical Waveguides," IEEE Photonics Technology Letters, vol. 4, No. 10, Oct. 1992, 4 pages.

Pu, A. et al., "Exposure Schedule for Multiplexing Holograms in Photopolymer Films," Optical Engineering, vol. 35, No. 10, Oct. 1996, 6 pages.

Han, X. et al., "Accurate Diffraction Efficiency Control for Multiplexed Volume Holographic Gratings," Optical Engineering, vol. 41, No. 11, Available Online Oct. 2002, 13 pages.

Yan, A. et al., "Multiplexing Holograms in the Photopolymer with Equal Diffraction Efficiency," Advances in Optical Data Storage Technology, SPIE vol. 5643, Nov. 2004, 9 pages.

Massenot, S. et al., "Multiplexed Holographic Transmission Gratings Recorded in Holographic Polymer-Dispersed Liquid Crystals: Static and Dynamic Studies," Applied Optics, vol. 44, No. 25, Sep. 2005, 8 pages.

Zharkova, G. et al., "Study of the Dynamics of Transmission Gratings Growth on Holographic Polymer-Dispersed Liquid Crystals," International Conference on Methods of Aerophysical Research, ICMAR 2008, Jun. 2008, 4 pages.

Kress, B. et al., "Exit Pupil Expander for Wearable See-Through Displays," Photonic Applications for Aerospace, Transportation, and Harsh Environment IIII, SPIE vol. 8368, Apr. 2012, 8 pages.

IPEA European Patent Office, Second Written Opinion issued in PCT Application No. US2014043549, Apr. 17, 2015, Germany, 5 pages.

IPEA European Patent Office, International Preliminary Report on Patentability Issued in Application No. PCT/US2014/043549, Jul. 14, 2015, WIPO, 7 pages.

European Patent Office, Office Action Issued in European Patent Application No. 14744987.0, Sep. 15, 2016, Germany, 3 Pages.

* cited by examiner

EYE-TRACKING SYSTEM USING A FREEFORM PRISM

BACKGROUND

Near-eye display devices are configured to present images to a user via a display that is positioned close to the user's eyes. For example, a head-mounted augmented reality display device may be worn on a user's head to position a near-eye display directly in front of a user's eyes. The near-eye display device may include an imaging device for tracking a gaze of a user based on light reflected from the user's eyes.

SUMMARY

Embodiments are provided for a see-through head-mounted display system. In one embodiment, the see-through head-mounted display system includes a freeform prism, a display device configured to emit display light through the freeform prism to an eye of a user, and an imaging device configured to receive gaze-detection light reflected from the eye and directed through the freeform prism. The see-through head-mounted display system may also include an illumination prism through which display light is emitted and gaze-detection light is emitted and received. In this way, the display light and gaze-detection light may share optics in order to provide a compact structure. The arrangement described herein may also enable the imaging device to be positioned at a back focal plane of the system, so that the imaging system is object-space telecentric. The telecentricity of the imaging system enables the system to maintain accuracy in gaze direction determinations regardless of changes of the distance between an eye of the user and elements of the see-through head-mounted display system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Near-eye display systems may include components for tracking a gaze of a user in addition to components for displaying an image to a user. In near-eye display systems that utilize a waveguide or similar display technology, a glint source and a camera for a gaze-tracking system may be positioned externally to the waveguide, such that light transmitted by the glint source and received by the camera does not pass through the waveguide. Such systems may be sensitive to eye longitudinal and transverse movement, such as changes in the distance between an eye and one or more components of the near-eye display. For example, as the eye moves away from the near-eye display, an image of the eye received at the camera may appear smaller, thereby distorting the relative positions of the eye and a glint or other tracking element directed to the eye for gaze tracking.

Thus, embodiments are disclosed for utilizing a freeform prism in a near-eye display system such that a display and a gaze-tracking system may utilize the same optical components for transmitting and/or receiving light. The shared optical configuration allows the gaze-tracking system to be object-space telecentric, such that embodiments of the system that position the gaze-tracking system at a back focal plane of the freeform prism are less sensitive to eye longitudinal and transverse movement than non-telecentric configurations. The freeform prism enables the eye image to be collimated and focused at a camera lens of the gaze-tracking system without magnifying the image. Accordingly, eye movement relative to the near-eye display system may not affect the accuracy of the gaze-tracking system.

Figure 1:
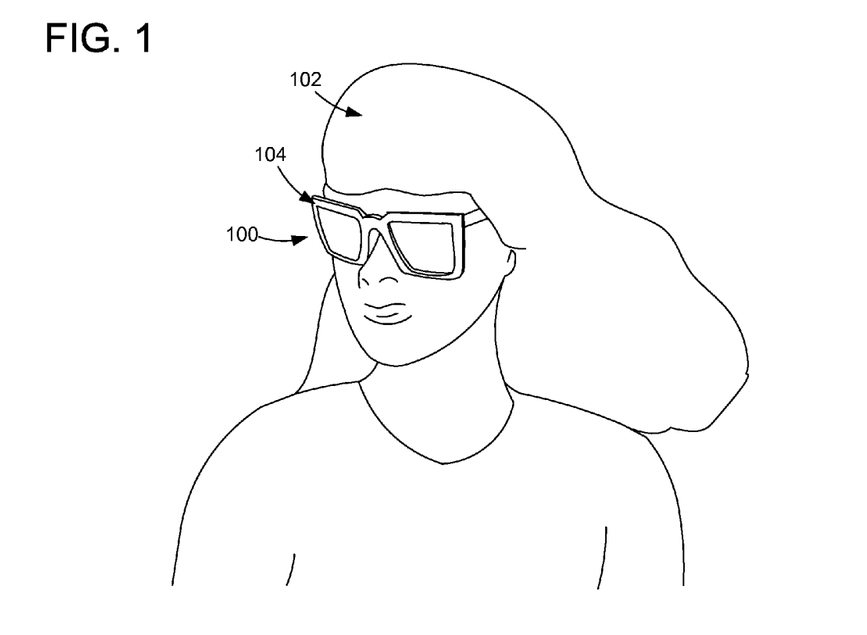
FIG. 1 shows a see-through head-mounted display device as worn by a user in accordance with an embodiment of the present disclosure.

FIG. 1 shows an example embodiment of a near-eye display system in the form of a see-through head-mounted display device 100 worn by a user 102. The head-mounted display device 100 may be used, for example, to display augmented reality images via a see-through display in which displayed virtual objects are viewable along with physical objects in a real-world background scene. While described in the context of a head-mounted display device, it will be understood that the disclosed embodiments may be used with any other suitable near-eye display device. The see-through head-mounted display device 100 may include a frame 104 for positioning the device at a target viewing location relative to the eyes of the user 102. For example, the target viewing location may correspond to a region in space inside of which an eye may properly perceive displayed images.

Figure 2:
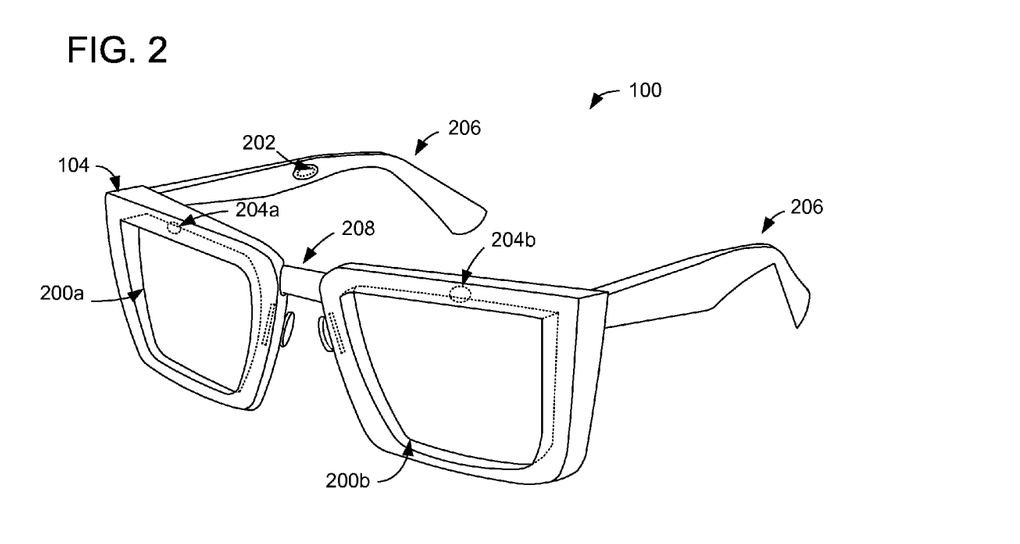
FIG. 2 schematically shows the see-through head-mounted display device of FIG. 1 in accordance with an embodiment of the present disclosure.

FIG. 2 shows a schematic depiction of the see-through head-mounted display device 100 of FIG. 1. The depicted see-through head-mounted display device 100 includes a right see-through display 200a and a left see-through display 200b. Each see-through display may be configured to both display images to a user and allow a user to view the real-world environment. For example, each see-through display may include a display device configured to emit display light through an optical configuration to an eye of a user. The optical configuration may also allow light from the real-world environment to reach the eye of the user. FIG. 2 schematically illustrates speakers 202 that may be used to output acoustic information to a user. Such acoustic information may take any suitable form, including but not limited to a computer-generated voice output in an appropriate language (e.g. as selected by a user), tones or other sounds that are not specific to any language, and/or any other suitable sounds. In some embodiments, other types of outputs may be provided by the see-through head-mounted display device 100, such as haptic/tactile outputs.

The see-through head-mounted display device 100 includes a right eye camera 204a and a left eye camera 204b, schematically illustrated in FIG. 2. The cameras 204a and 204b may be configured to capture images of each eye of a user for determining a gaze direction. For example, the eye cameras 204a and 204b may receive gaze-detection light (e.g., from a glint light source) as reflected off of the eyes of the user, and track a gaze of a user based on the position and movement of the reflected gaze-detection light. As described in more detail below with respect to FIGS. 3 and 4, the eye cameras 204a and 204b may utilize at least a portion of the optical configuration used by a display device of the see-through displays 200a and 200b. Accordingly, the eye cameras may be positioned at a front side of the display device, as gaze-detection light may be focused onto the cameras via the optical configuration of the see-through displays.

The see-through displays 200a and 200b and the eye cameras 204a and 204b may be positioned at a viewing location relative to the eye via one or more securing mechanisms of the frame 104. For example, as illustrated in FIG. 2, the frame 104 may be supported by ears of a user via ear pieces 206 and by the nose of a user via nose bridge 208 to reduce slippage of the frame 104. It is to be understood that supports, such as the ear pieces 206, nose pieces, and nose bridge 208, illustrated in FIG. 2 are exemplary in nature, and the see-through displays of the head-mounted see-through display device may be positioned at the viewing location via any suitable mechanism. For example, additional supports may be utilized, and/or one or more of the supports illustrated in FIG. 2 may be removed, replaced, and/or augmented to position the see-through displays at the viewing location. Furthermore, see-through displays may be positioned in a viewing location by mechanisms other than supports that physically touch a user without departing from the scope of this disclosure.

During use, a distance between the eye, the displays 200a and 200b, and the eye cameras 204a and 204b may change. As discussed above, unless the system is object-space telecentric, a size of the images of the eye from the eye cameras 204a and 204b may be altered responsive to such changes in distance between the eye and the displays/cameras. Thus, an entrance pupil of each of eye cameras 204a and 204b may optionally be positioned at the back focal plane of the optics of the display devices 200a and 200b, respectively, in order to maintain accurate gaze tracking regardless of depth changes between the eye, the optics, and the eye cameras.

Figure 3:
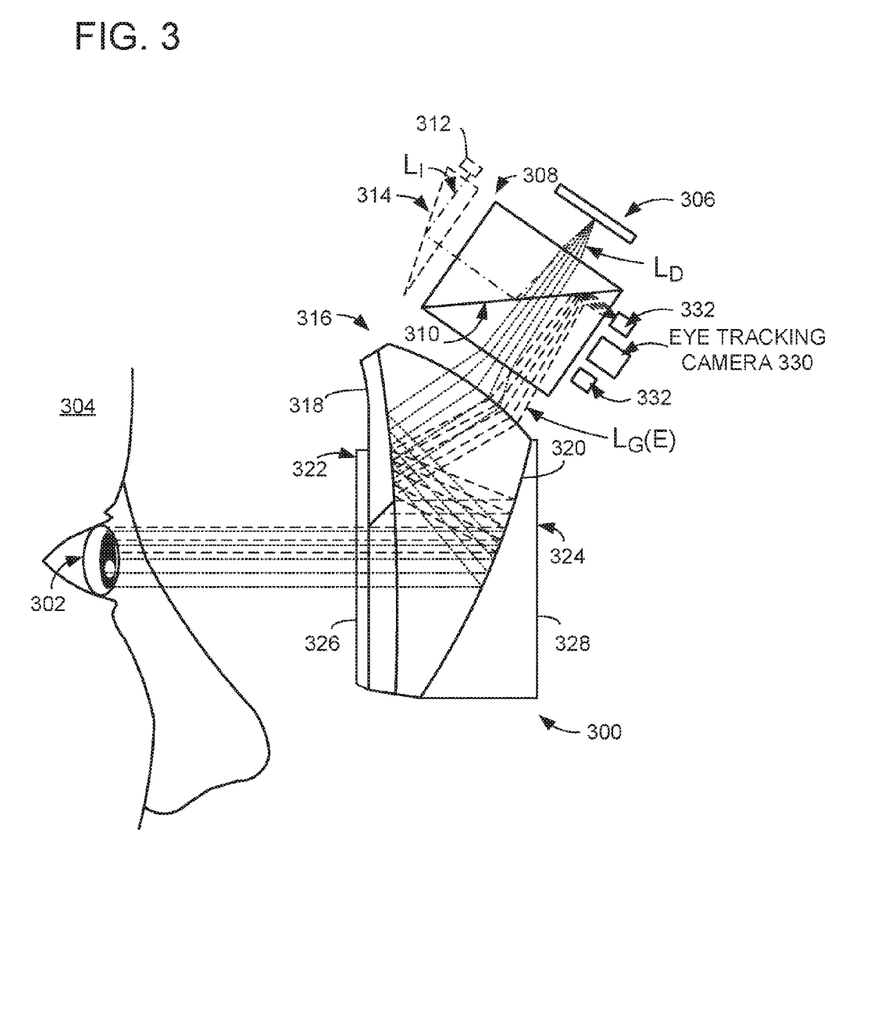
FIG. 3 schematically shows a see-through display and optical paths for directing display light and gaze-detection light to an eye of a user in accordance with an embodiment of the present disclosure.

Turning now to FIG. 3, an example embodiment of a see-through display 300 is depicted. The see-through display 300 includes an optical configuration for directing both display light and gaze-detection light to an eye 302 of a user 304. The see-through display 300 includes a display subsystem, shown schematically at 306, configured to produce an image for display to user 304. The display subsystem 306 may comprise any suitable components for producing images for display, including but not limited to a microdisplay and one or more light sources. Display light, $L_D$, from display subsystem 306 travels along the display optical path (indicated by rays originating at the display subsystem 306) to reach the user's eye 302. It will be understood that separate see-through displays 300 may be used for left eye and right eye displays, as shown in FIG. 2.

The display subsystem 306 may direct light through an illumination prism 308 including a beam splitter 310 (e.g., a polarizing beam splitter or hot mirror) configured to transmit the display light from the display device. For example, the beam splitter 310 may be configured to pass visible light while reflecting infrared light. In some embodiments, the display subsystem 306 may include a reflective micro-display, such as a liquid crystal on silicon (LCoS) display. In other embodiments, the display subsystem may include an emissive micro-display, such as organic light emitting diode (OLED) array display types, inorganic light emitting diode (iLED) array display types, and/or any other suitable micro-display. The beam splitter 310 may include a polarizing beam splitter, and an illumination light source 312 may be configured to emit illumination light, $L_I$, into the illumination prism 308 (e.g., from an optical wedge 314 to the polarizing beam splitter). The illumination light source 312 may comprise one or more light sources, such as an RGB LED array, one or more white LEDs (e.g., with a color filter arrangement), and/or any suitable illumination light source configuration. As the polarizing beam splitter splits the illumination light into beams of different polarization, the polarizing beam splitter may be configured to reflect a portion of the polarized illumination light toward the LCoS display for illuminating the display. The display may reflect the illumination light to generate the display light, $L_D$, depicted in FIG. 3, and the polarizing beam splitter may be configured to transmit a portion of the display light toward the eye 302 of the user 304.

The see-through display 300 includes a freeform prism 316 for directing light from the illumination prism 308 to the eye 302 of the user 304. The freeform prism 316 may have positive optical power and comprise at least three surfaces, each surface being non-planar and non-spherical. For example, the freeform prism 316 may include a user-facing surface 318 having a total internal reflective coating in order to direct the light into the user's eye 302. The freeform prism 316 may also include an outward-facing surface 320 opposite the user-facing total internal reflective surface, the outward-facing surface 320 having a coating that is highly reflective for infrared light and partially reflective for visible light. For example, the outward-facing surface 320 may be more reflective for infrared light than for visible light. In some embodiments, the outward-facing surface 320 may be configured to reflect substantially all infrared light and a portion of visible light.

The see-through display 300 may include one or more compensators positioned around the freeform prism 316. As illustrated in FIG. 3, the see-through display 300 includes a user-facing compensator 322 positioned on an eye-side of the freeform prism and an outward-facing compensator 324 positioned on an environment-side of the freeform prism. Accordingly, the freeform prism 316 is positioned between the user-facing compensator 322 and the outward-facing compensator 324, such that light from the environment passes through the outward-facing compensator 324, then through the freeform prism 316, and then through the user-facing compensator 322 before reaching the eye 302. An eye-side surface 326 of the user-facing compensator 322 (e.g., the surface of the user-facing compensator 322 that is closest to the eye 302) may be substantially parallel to an environment-side surface 328 of the outward-facing compensator 324 (e.g., the surface of the outward-facing compensator 324 that is furthest away from the eye 302). The compensators 322 and 324 are configured to have a substantially similar index of refraction as the freeform prism and to compensate for distortion of light from the real-world environment of the user 304 caused by the optical power of the freeform prism 316. The distortion compensation provided by the compensators 322 and 324 may be affected by the index of refraction of an adhesive used to couple the compensators to the freeform prism 316. Therefore, adhesives having indices of refraction closer to that of the freeform prism 316 and/or compensators 322 and 324 may enable a greater amount of distortion compensation than adhesives having different indices of refraction. Similarly, thinner layers of adhesives may provide less distortion.

Figure 4:
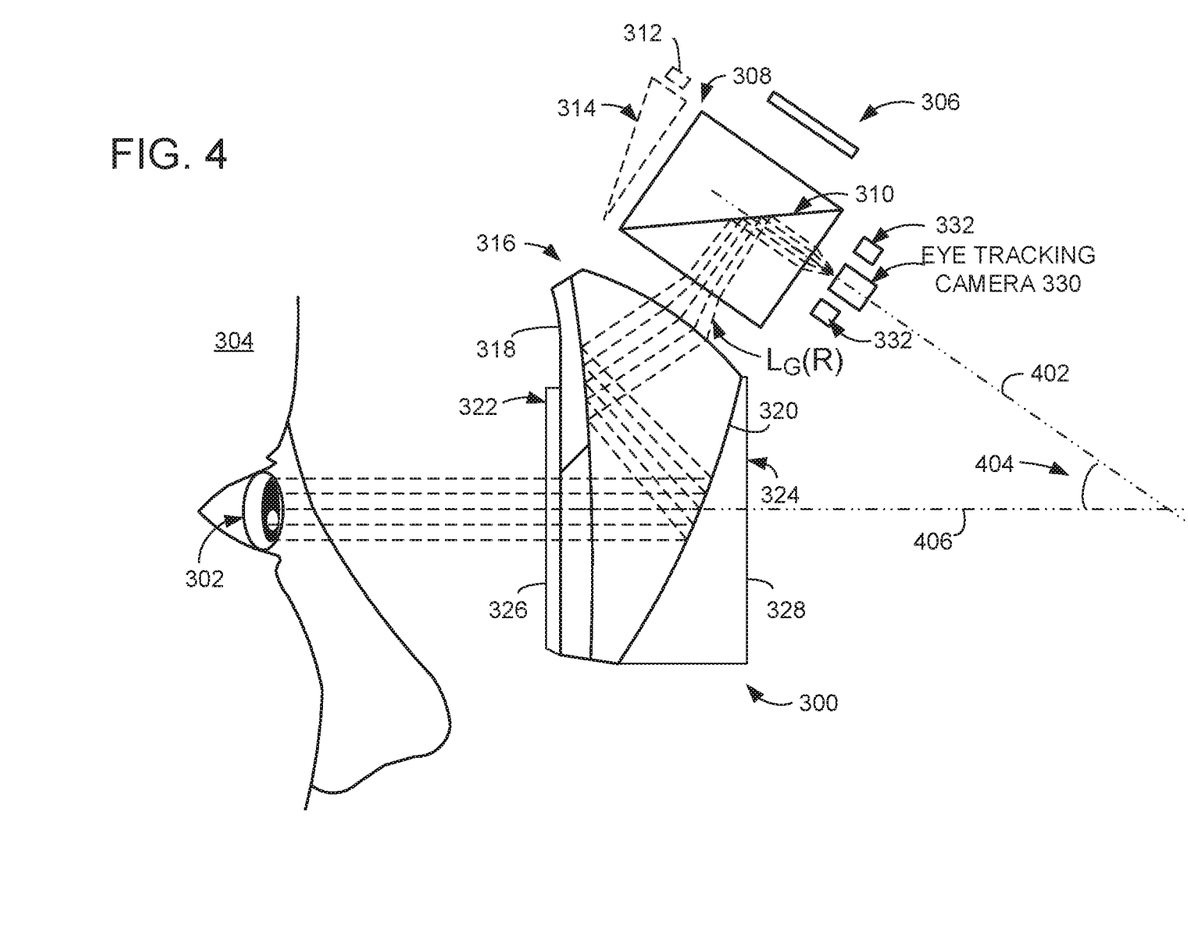
FIG. 4 schematically shows the see-through display of FIG. 3 and an optical path for acquiring images of an eye to detect a gaze direction in accordance with an embodiment of the present disclosure.

The see-through display 300 also includes an eye tracking system comprising an imaging device, such as an eye tracking camera 330, and one or more glint sources 332 (e.g. one or more infrared light sources) configured to produce light for reflection from the user's eye. Emitted gaze-detection light, $L_G(E)$, from the glint sources 332 may travel along a gaze-detection optical path (indicated by rays originating at one of the glint sources 332) through at least a portion of the optics utilized for the display optical path. Turning briefly to FIG. 4, emitted gaze-detection light, $L_G(E)$, from the glint sources 332 may reflect from the user's eye 302, such that reflected gaze-detection light, $L_G(R)$, is returned to eye tracking camera 330 via a reverse gaze-detection optical path (e.g. along at least a portion of the gaze-detection optical path in a reverse direction). In the depicted example, images from the user's eye are diverted away from the display subsystem 306 and toward the eye tracking camera 330 by the beam splitter 310 located immediately before the camera along the reverse display optical path.

As shown in FIGS. 3 and 4, the eye tracking camera 330 images, or receives reflected gaze-detection light, $L_G(R)$, through a first side of the illumination prism 308 and the display subsystem 306 emits the display light, $L_D$, through a second, different side of the illumination prism 308. For example, the eye tracking camera 330 may be positioned such that an optical axis 402 of the camera forms an acute angle 404 (e.g., an angle that is less than 90 degrees) with a visual axis 406 of the user 304 and/or see-through display 300. The visual axis 406 may represent a central axis or plane for all light that is detected by the eye 302. Accordingly, the eye tracking camera 330 and the display subsystem 306 interact with sides that are adjacent and/or substantially perpendicular to one another. In some embodiments, the glint source 332 may emit the gaze-detection light, $L_G(E)$, through the first side of the illumination prism 308. Thus, the glint source may be positioned on a substantially similar side of the illumination prism as the imaging device. In additional or alternative embodiments, the glint source 332 may emit the gaze-detection light, $L_G(E)$, through the second side of the illumination prism 308 and/or from any other suitable location. Although exemplary optical paths to the user's eye 302 and to the eye tracking camera 330 are depicted in FIGS. 3 and 4, the optical paths may take any other suitable form.

The eye tracking system (e.g., the eye tracking camera 330 and/or the glint sources 332) may detect a location of the eye and/or anatomical structures thereof (e.g. a pupil of the eye 302). The eye tracking system may also detect a location of reflections from glint sources 332 in the image data acquired via eye tracking camera 330, and from this information determine a direction in which the eye is gazing. As depicted in FIG. 4, chief rays of the reflected gaze-detection light are parallel to one another, and the eye tracking camera 330 may have an entrance pupil positioned at a back focal plane of the freeform prism 316. Accordingly, the eye tracking camera 330 may be object-space telecentric, creating an orthographic view of the eye that remains the same size even as the distance between the eye and the see-through display 300, eye tracking camera 330, and/or glint sources 332 changes. The telecentric configuration described above reduces perspective error and distortion, thereby ensuring accurate edge and feature detection during eye position adjustments.

Figure 5:
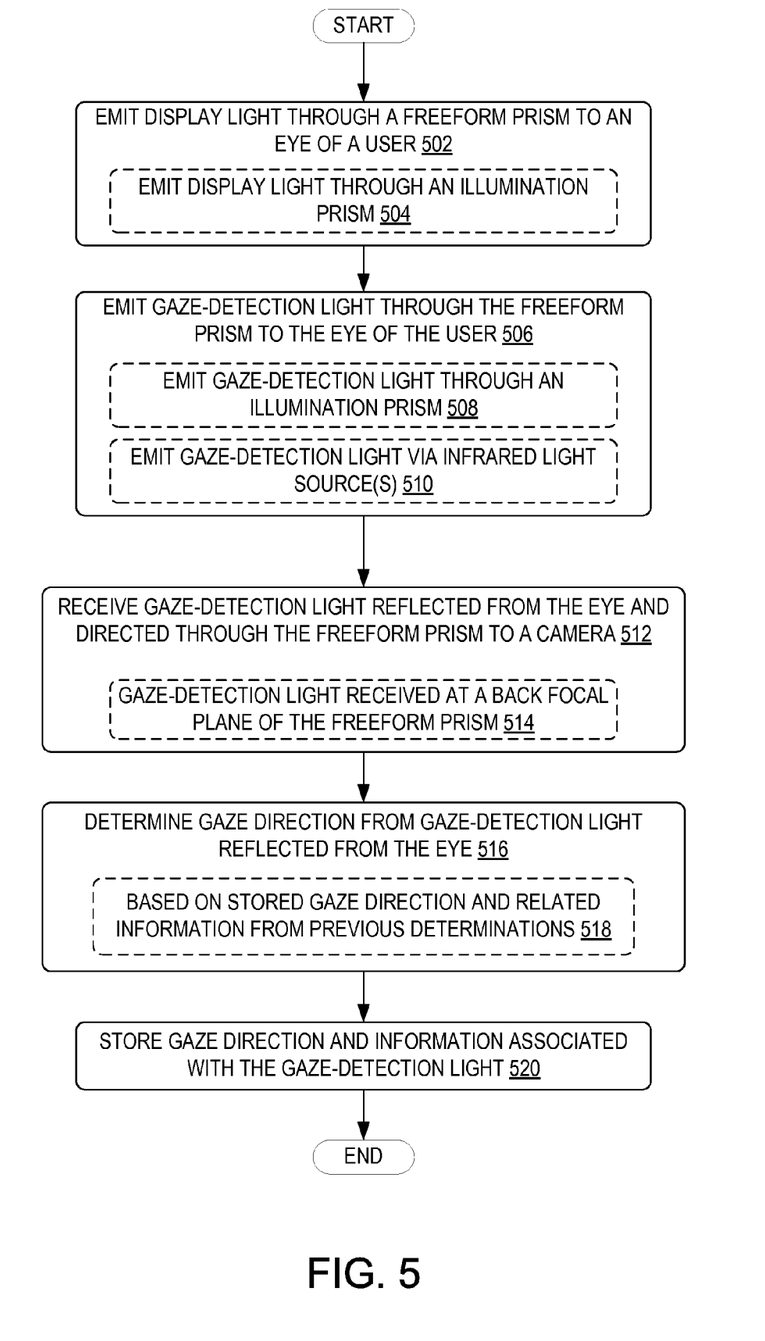
FIG. 5 shows a flow diagram of a method of performing gaze-detection with a see-through head-mounted display device in accordance with an embodiment of the present disclosure.

FIG. 5 shows a flow chart of a method 500 of performing gaze-detection with a see-through head-mounted display device, such as the see-through head-mounted display device 100 of FIG. 1. Method 500 includes emitting display light through a freeform prism to an eye of a user at 502. The freeform prism 316 of FIG. 3 is one non-limiting example of a freeform prism through which the display light of method 500 may be emitted. The method 500 may include emitting display light through an illumination prism, as indicated at 504. For example, display light may be emitted through the illumination prism prior to entering the freeform prism. At 506, the method 500 includes emitting gaze-detection light through the freeform prism to the eye of the user. The gaze-detection light may also be emitted through the illumination prism, as indicated at 508. Accordingly, the gaze-detection light may be emitted through the same optical components as the display light. As indicated at 510, the gaze-detection light may optionally be emitted via one or more infrared light sources.

At 512, the method 500 includes receiving the gaze-detection light as reflected from the eye and directed through the freeform prism to a camera. For example, as shown in FIG. 4, the eye tracking camera 330 may receive reflected gaze-detection light through the same optical components as the display light and the emitted gaze-detection light, along a reverse optical path of the emitted gaze-detection light. As indicated at 514, the gaze-detection light may optionally be received at a back focal plane of the freeform prism, such that the imaging system is object-space telecentric. The method 500 includes determining gaze direction from the gaze-detection light reflected from the eye at 516. For example, the gaze direction may be determined by tracking a location of a glint (e.g., a glint from the gaze-detection light) on a pupil of a user as the pupil moves, and determining the relative position between the glint and the pupil. As indicated at 518, the method may include basing the determination of the gaze direction on stored gaze direction and related information from previous gaze direction determinations. For example, previously-gathered data regarding an association between gaze-detection light and a determined gaze direction may be utilized to adjust and/or calibrate a current gaze direction determination. In some embodiments, this may be implemented using machine-learning. Upon determining gaze direction, the method 500 includes storing the gaze direction and information associated with the gaze-detection light, as indicated at 520. The stored gaze direction and information associated with the gaze-detection light may thus be used in future gaze direction determinations.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
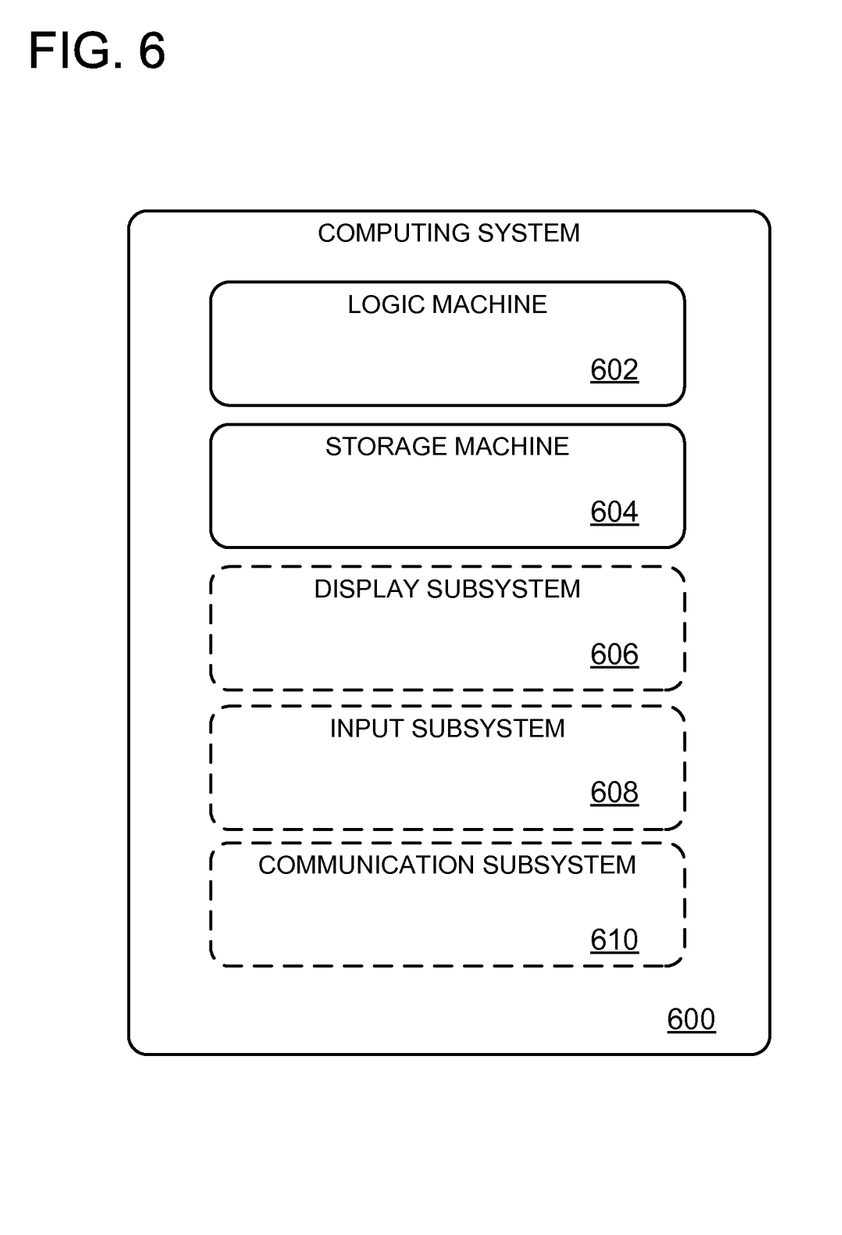
FIG. 6 shows a block diagram of a computing system in accordance with an embodiment of the present disclosure.

FIG. 6 schematically shows a non-limiting embodiment of a computing system 600 that can enact one or more of the methods and processes described above. Computing system 600 is shown in simplified form. Computing system 600 may take the form of one or more see-through head-mounted displays, personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices. In some embodiments, the display subsystem may include a near-eye display such as see-through display 300.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A see-through head-mounted display system comprising:
   a freeform prism;
   a display device configured to emit display light through the freeform prism to an eye of a user;
   an imaging device having an entrance pupil positioned at a back focal plane of the freeform prism to provide object-space telecentric eye tracking, the imaging device configured to receive gaze-detection light reflected from the eye and directed through the freeform prism; and
   an illumination prism including a display-facing side, an eye-facing side, a camera-facing side between the display-facing side and the eye-facing side, and an interior beam splitter, wherein the illumination prism is optically intermediate the display device and the freeform prism, optically intermediate the imaging device and the freeform prism, and optically separated from the freeform prism,
wherein the illumination prism is positioned to receive, at the display-facing side, the display light from the display device and to transmit the display light through the beam splitter and the eye-facing side to the freeform prism, and
wherein the illumination prism is positioned to receive, at the eye-facing side, the gaze-detection light reflected from the eye and through the freeform prism and to reflect the gaze-detection light at the beam splitter through the camera-facing side to the imaging device.

2. The see-through head-mounted display system of claim 1, further comprising a frame configured to position the freeform prism at a viewing location relative to the eye.

3. The see-through head-mounted display system of claim 1, wherein the freeform prism has positive optical power.

4. The see-through head-mounted display system of claim 1, further comprising a glint source configured to emit the gaze-detection light toward the camera-facing side of the illumination prism.

5. The see-through head-mounted display system of claim 4, wherein the beam splitter is positioned to reflect the gaze-detection light from the glint source toward the eye-facing side of the illumination prism and the freeform prism.

6. The see-through head-mounted display system of claim 5, wherein the glint source comprises a plurality of glint sources positioned on different sides of the imaging device.

7. The see-through head-mounted display system of claim 1, further comprising a user-facing compensator and an outward-facing compensator, the freeform prism positioned between the user-facing compensator and the outward-facing compensator, and an eye-side surface of the user-facing compensator being substantially parallel to an environment-side surface of the outward-facing compensator.

8. The see-through head-mounted display system of claim 7, wherein the user-facing compensator and the outward-facing compensator each have a substantially similar index of refraction as the freeform prism.

9. The see-through head-mounted display system of claim 1, wherein the freeform prism comprises at least three surfaces, each surface being non-planar and non-spherical.

10. The see-through head-mounted display system of claim 9, wherein the at least three surfaces includes a user-facing total internal reflective surface.

11. The see-through head-mounted display system of claim 10, wherein the at least three surfaces further includes an outward-facing surface opposite the user-facing total internal reflective surface, the outward-facing surface having a coating that is more reflective for infrared light than for visible light, and where the coating is partially reflective for visible light.

12. The see-through head-mounted display system of claim 1, wherein the display device comprises an illumination light source and a liquid crystal on silicon (LCoS) micro-display, the illumination light source configured to direct illumination light through the illumination prism to the LCoS.

13. The see-through head-mounted display system of claim 12, wherein the illumination light source emits the illumination light through an illumination-facing side of the illumination prism, the illumination-facing side being between the display-facing side and the eye-facing side and opposite of the camera-facing side.

14. An eye-tracking system comprising:
a glint source configured to emit gaze-detection light through a freeform prism to an eye of a user;
an imaging device having an entrance pupil positioned at a back focal plane of the freeform prism to provide object-space telecentric eye tracking, the imaging device configured to receive gaze-detection light reflected from the eye and directed through the freeform prism;
a display device configured to emit display light through the freeform prism to an eye of a user; and
an illumination prism including a beam splitter, the illumination prism positioned to:
receive the display light from the display device at a first side and pass the display light to the freeform prism via transmission of the display light through the beam splitter,
receive the emitted gaze-detection light from the glint source at a second side and pass the emitted gaze-detection light to the freeform prism via reflection of the gaze-detection light by the beam splitter, and
receive, at a third side of the illumination prism, return gaze-detection light comprising the emitted gaze-detection light as reflected from the eye and directed through the freeform prism,
reflect, at the beam splitter, the return gaze-detection light through the second side to the imaging device, the second side of the illumination prism being in between and adjacent to each of the first side of the illumination prism and the third side of the illumination prism, the first side of the illumination prism being opposite of the third side of the illumination prism.

15. The eye-tracking system of claim 14, wherein the glint source comprises at least one infrared light source.

16. The eye-tracking system of claim 15, wherein the beam splitter is configured to transmit visible light and reflect the gaze-detection light from the glint source.

17. The eye-tracking system of claim 16, wherein the glint source and the imaging device are each positioned adjacent the second side of the illumination prism, the freeform prism is positioned adjacent the third side of the illumination prism, and the display device is positioned on the first side of the illumination prism.

18. A method of performing gaze-detection with a see-through head-mounted display system that is object-space telecentric, the method comprising:
emitting display light from a display device through a first side of an illumination prism to a freeform prism and then from the freeform prism to an eye of a user, the display device being illuminated via illumination light received at a fourth side of the illumination prism and directed to the display device, the fourth side being adjacent to the first side;
receiving gaze-detection light at a back focal plane of the freeform prism, the gaze-detection light being received from a glint source at a second side of the illumination prism, transmitted through a third side of the illumination prism to the eye via the freeform prism, reflected from the eye and directed back through the freeform prism to the third side of the illumination prism, and directed through the second side of the illumination prism to an image sensor, the second side being in between and adjacent to each of the first side of the illumination prism and the third side of the illumination prism, and the second side being opposite of the fourth side of the illumination prism; and determining gaze direction from the gaze-detection light reflected from the eye and directed to the image sensor.

19. The method of claim 18, further comprising emitting the gaze detection light from the glint source to the second side of the illumination prism, then from the illumination prism to the freeform prism, and through the freeform prism to the eye.

20. The method of claim 18, further comprising storing the gaze direction and information associated with the gaze-detection light for use in future gaze direction determinations.

* * * * *